United States Patent [19]

Le et al.

[11] Patent Number: 5,603,152
[45] Date of Patent: Feb. 18, 1997

[54] METHOD FOR MANUFACTURING A TWO BLOCK LINE CONNECTOR

[75] Inventors: Anh Le; Richard L. Marker, both of Lockport, N.Y.; Richard J. Raterman, Kettering, Ohio

[73] Assignee: General Motors Corporation, Detroit, Mich.

[21] Appl. No.: 358,495

[22] Filed: Dec. 19, 1994

[51] Int. Cl.⁶ .............................. B23P 11/02; F16L 35/00
[52] U.S. Cl. ........................ 29/506; 29/509; 29/525.05; 29/890.035; 285/24
[58] Field of Search ..................... 29/890.035, 890.043, 29/505, 506, 508, 513, 509, 510, 525.05; 285/24, 25, 26, 27, 158, 159

[56] References Cited

U.S. PATENT DOCUMENTS

| | | | |
|---|---|---|---|
| 1,829,387 | 10/1931 | Arnold | 29/890.035 |
| 2,760,262 | 8/1956 | Homan | 29/513 |
| 3,409,314 | 11/1968 | Roe | 29/508 X |
| 4,550,936 | 11/1985 | Haeber et al. | 285/26 |
| 4,606,111 | 8/1986 | Okazaki et al. | 29/513 X |
| 4,613,161 | 9/1986 | Brisco | 285/24 X |
| 5,163,716 | 11/1992 | Bolton et al. | 285/158 |
| 5,179,844 | 1/1993 | Lyman et al. | 62/503 |
| 5,191,775 | 3/1993 | Shiina et al. | 62/503 |
| 5,308,125 | 5/1994 | Anderson, Jr. | 285/349 |
| 5,354,101 | 10/1994 | Anderson, Jr. | 285/25 |

*Primary Examiner*—Larry I. Schwartz
*Assistant Examiner*—Khan V. Nguyen
*Attorney, Agent, or Firm*—Patrick M. Griffin

[57] ABSTRACT

A secondary connector block of the type that is used to reinforce a port through a thin wall so that a mating primary connector block which has a bolt hole offset to the side of a refrigerant line can be used to connect the line concentrically to the port. The secondary connector block consists of a completely cylindrical base with an intermediate annular groove circling its outer surface. The base can be turned on a lathe, since it is completely symmetrical about its axis. The base is first welded concentrically to the port, which is easily done, since no part of the base overhangs the surface of the wall. The side lobe which contains the bolt hole that aligns with the primary block is attached later by a pair of bendable legs that are formed around and into the groove. The legs may be wide enough to fit very tightly into the groove, in which case the side lobe is first turned to the orientation that aligns the bolt holes. Or, the legs may be made slightly narrower, giving enough clearance in the groove to allow the side lobe to be turned to the proper orientation later. In that case, bolting the blocks together acts to slightly tilt the side lobe and lock it tightly in position.

2 Claims, 4 Drawing Sheets

METHOD FOR MANUFACTURING A TWO BLOCK LINE CONNECTOR

This invention relates to connectors of the type that fluidly connect a refrigerant line to a port using a bolt that runs through a block fixed to the end of the line, and specifically to such a connector in which the port is cut through a wall that is too thin to thread the bolt into it directly.

BACKGROUND OF THE INVENTION

Automotive air conditioning systems incorporate numerous fluid tight connections between refrigerant lines and other components, such as compressors, condensers, evaporators, accumulator canisters, as well as other refrigerant lines. These fluid connections have to be made during installation and broken during servicing, in very confined underhood spaces. Historically, most such connections were made with threaded hose type fittings, which require a good deal of space within which to swing a tool over a wide arc, around the axis of the line. Increasingly, such connections are being made with block type connectors, in which at least one block welded or brazed to the end of the refrigerant line is attached by a bolt that runs through the block, offset to the side of, and parallel to, the axis of the line. This type of connector generally requires less tool access space, since the tool that drives the bolt fits in close to the line. It also generally gives a good, leak free seal, the compression of which is controlled simply within less space than a conventional hose type fitting tool would require.

A block type fitting can be used to connect two lines to one another, end to end. In that case, two mating blocks, one fixed to the end of each line, are fastened together with a bolt that runs through both blocks, parallel to the common axis of the lines. Neither block is symmetric to the axis. Rather, each has a lobe offset to the side, through which the bolt extends. A block fitting can also be used to fluidly connect a single line to a port that opens through the wall of another component, such as a condenser tank or an accumulator canister. If the wall through which the port opens is thick enough, then the bolt can be threaded directly into it, and only one connector block, then one fixed to the end of the refrigerant line, is needed. An example may be seen in U.S. Pat. No. 5,191,775, in which an accumulator canister has an end cap thick enough to accept the bolt directly.

If the port to which the line is to be connected is too thin to accept the bolt directly, it must be locally reinforced surrounding the port. For example, in co-assigned U.S. Pat. No. 5,163,716, a line 12 is to be connected to a port P in the thin side wall of a condenser tank C. A secondary connector block 14 is attached to the tank C at the port P, with a robust weld bead 20. The secondary connector block 14 is thick enough to accommodate a threaded bolt hole 22. However, it should be noted that the refrigerant line 12 runs perpendicular to the port P, not concentric to it. The reason for this is that if the line 12 were to run concentric to the port P, then block 14 would have to have a lobe offset to the side of port P to accommodate the bolt 16. Such a side lobe interrupts the cylindrical symmetry of the block, and overhangs the wall surface to which it is welded, obstructing access to the welding tool. It happens to be space effective to plumb the condenser tank C with a refrigerant line that is perpendicular to the port, so there is no problem in that situation.

In some situations where it is desired to use a block connector, however, it is necessary both to run the line concentric to the port to which it is connected, and the wall surface is too thin to accept a threaded bolt directly. It is very difficult to weld a connector block with an overhanging side lobe to the component wall in such a situation, because of the obstructed welding tool access noted above.

SUMMARY OF THE INVENTION

The invention provides a new secondary connector block with an overhanging side lobe that can be easily welded to a thin component wall for reinforcement.

In the embodiment disclosed, the secondary connector block is built up successively of two pieces, a cylindrical base, which is welded to the wall first to reinforce the port, and a separate, fork shaped side lobe, which is crimped around the base later. The cylindrical base has an annular, concentric groove cut into its outer surface near its outer end, and can be simply turned on a lathe. The base can also be easily welded in place, since no part of it overhangs the weld surface to block access to the welding tool.

The separate side lobe has a bolt hole on one side and a U-shaped pair of ductile legs that match the base groove. The side lobe legs have a total effective length greater than half, but less than the total, circumference of the groove, and a width and thickness roughly equal to the groove. Therefore, after the cylindrical base has been welded in place, the side lobe legs can be crimped around and into the base groove. Because of the relation of total leg length to groove circumference, the side lobe grips enough of the base to hold securely. The side lobe may be turned initially to the angular position where its bolt hole matches that in the primary connector block, or, alternatively, the side lobe legs may be crimped into the base groove loosely enough that the side lobe may be turned manually to an aligned position when the connection is made. In that case, the act of tightening the bolt through the abutted blocks wedges the side lobe legs in the base groove to lock it tightly in position.

DESCRIPTION OF THE PREFERRED EMBODIMENT

These and other features of the invention will appear from the following written description, and from the accompanying drawings, in which.

Figure 10:
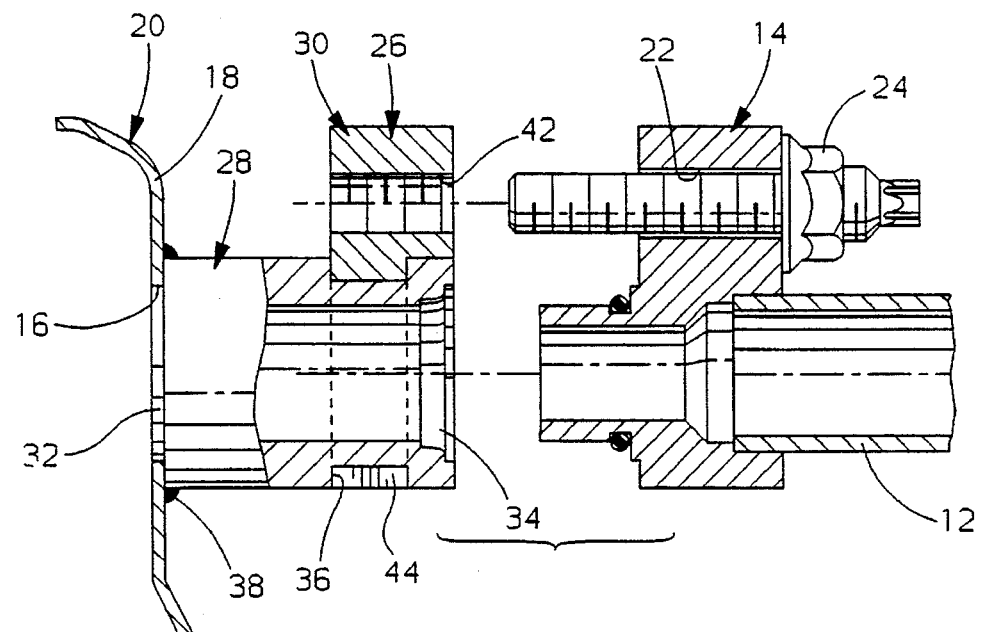
FIG. 10 is a view like FIG. 1, but showing the two connector blocks in the process of being attached.

Referring first to FIG. 10, the ultimate objective of the invention is to fluidly connect a refrigerant line 12, by a conventional, one piece primary connector block 14 to a port 16. Port 16 is cut through the thin aluminum side wall 18 of an A/D canister, indicated generally at 20. Primary connector block 14 has a bolt hole 22 located to the side of line 12, through which runs a threaded bolt 24. The metal in canister side wall 18 is far too thin to allow bolt 24 to be threaded directly into it, however. Therefore, a secondary connector block, indicated generally at 26, is used to reinforce and thicken the side wall 18 surrounding port 16. Details of secondary block 26 and the method by which it is manufactured and assembled are described next.

Figure 2:
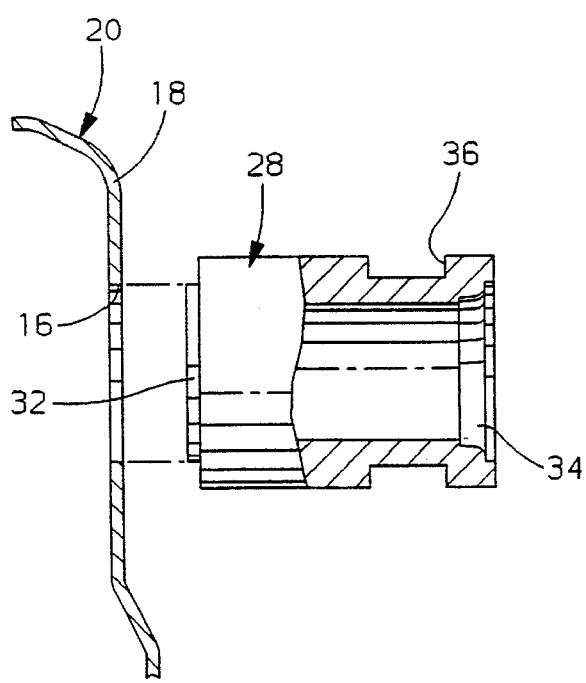
FIG. 2 is a view of one end of the base and the port through the canister wall to which the base is to be welded.
Figure 3:
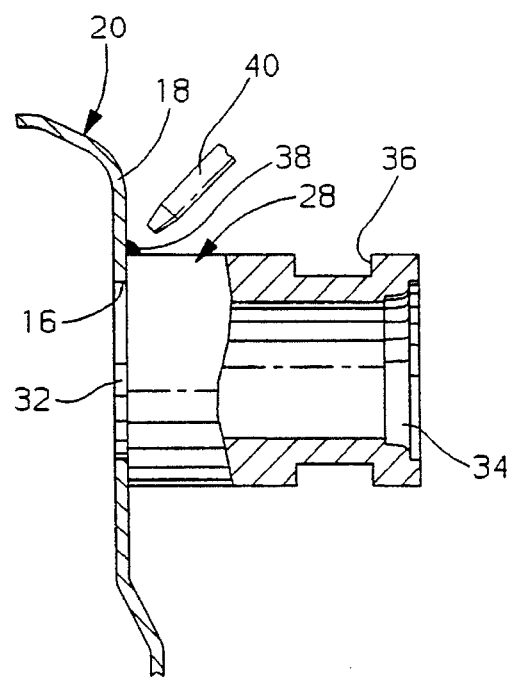
FIG. 3 is a view showing the base being welded in place.

Referring next to FIGS. 2 and 3, secondary connector block 26 comprises two initially separate pieces, a cylindrical base 28 and a forked side lobe 30. Base 28 is a hollow, thick walled, aluminum piece, with a stepped inner end 32 that plugs concentrically into port 16 and an outer end 34 into which the primary connector block 14 plugs. Intermediate the two ends 32 and 34, but closer to the outer end 34, is a 360 degree shallow annular groove 36, with a predetermined axial width W1, diameter D, and radial depth X, which is concentric to the central axis of base 28. Groove 36 cooperates with side lobe 30 in a manner detailed below. Because base 28 is entirely symmetrical about its central axis, it can be turned on a lathe or similar tool. Likewise, as best seen in FIG. 3, the simple shape of base 28 assures that, once its inner end 32 is inserted into port 16, it has no surfaces overhanging the outer surface of wall 18 surrounding port 16. Consequently, it is a relatively simple operation to solidly affix base 28 with a complete, robust weld bead 38 applied around the entire perimeter of base 28 by a conventional welding tool 40. There is nothing to obstruct the welding tool 40 from easily reaching the interface between the outer surface of base 28 and the outer surface of side wall 18.

Figure 4:
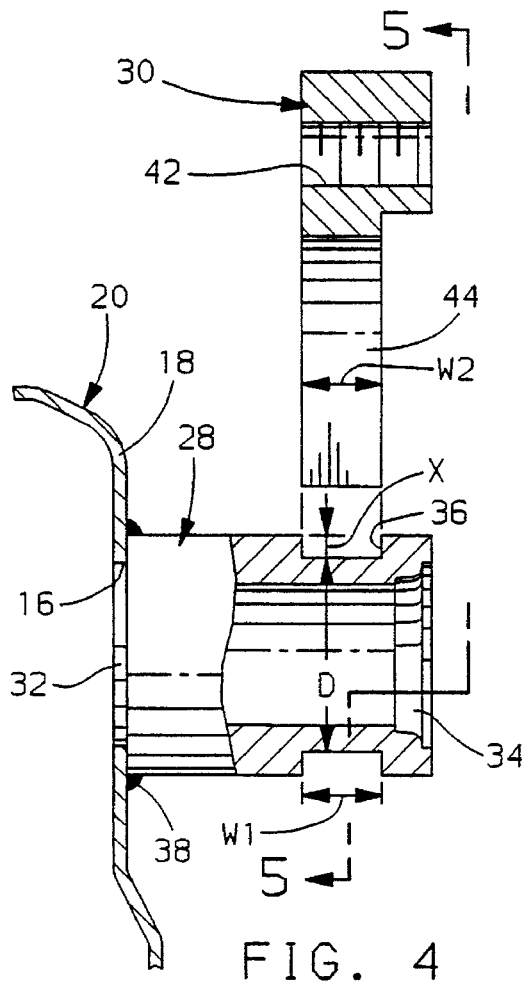
FIG. 4 is a view of the side lobe shown in cross section before it is inserted into the base groove.
Figure 5:
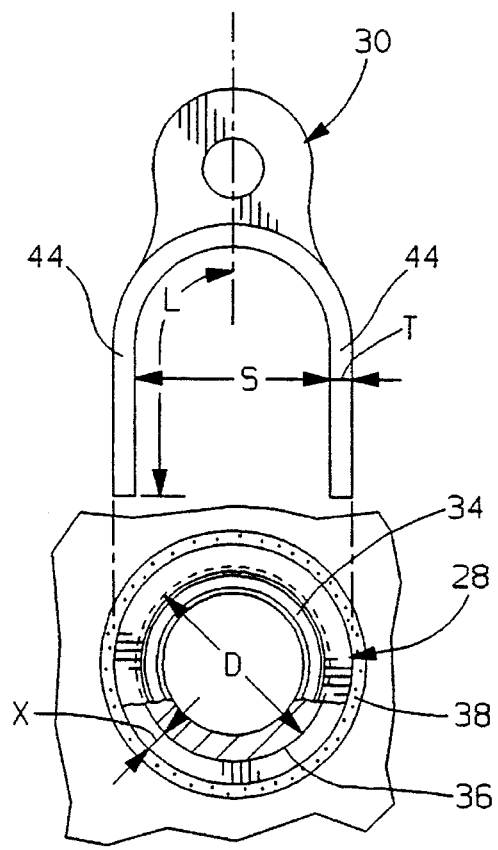
FIG. 5 is a view taken along the stepped line 5—5 of FIG. 4.

Referring next to FIGS. 4 and 5, side lobe 30 is also an aluminum piece, with a threaded bolt hole 42 that matches the primary connector block bolt hole 22, and a U-shaped pair of parallel legs 44. The various dimensions of the legs 44, in general, are determined by the dimensions of base groove 36. Specifically, the legs 44 have an axial width W2 that is less than the axial length of the bolt hole 42, but substantially equal to the width W1 of the base groove 36. The side lobe legs 44 also have a thickness T that substantially matches base groove depth X, and a separation S that substantially matches, or is just slightly less than, the base groove diameter D. Finally, each leg has an inside surface length L determined so that the total length of the two, 2L, is greater than half the circumference of base groove 36, but less than the entire circumference. Here, 2L is just less than the entire circumference ($\pi$D). While side lobe 30 is not symmetrical about any axis, as is the base 28, it may still be fairly simply manufactured by initially extruding a continuous aluminum billet with the cross sectional shape shown in FIG. 5. Then, pieces with a thickness equal to the necessary axial length of bolt hole 42 are sliced off. Finally, for each sliced off piece, the bolt hole 42 is drilled and tapped, and the legs 44 are milled down to the proper width W2. The leg thickness T, since it matches a relatively shallow groove depth X, is also sufficiently small to make the legs 44 ductile or bendable. As a consequence, side lobe 30 may be affixed to base 28 as described next.

Figure 1:
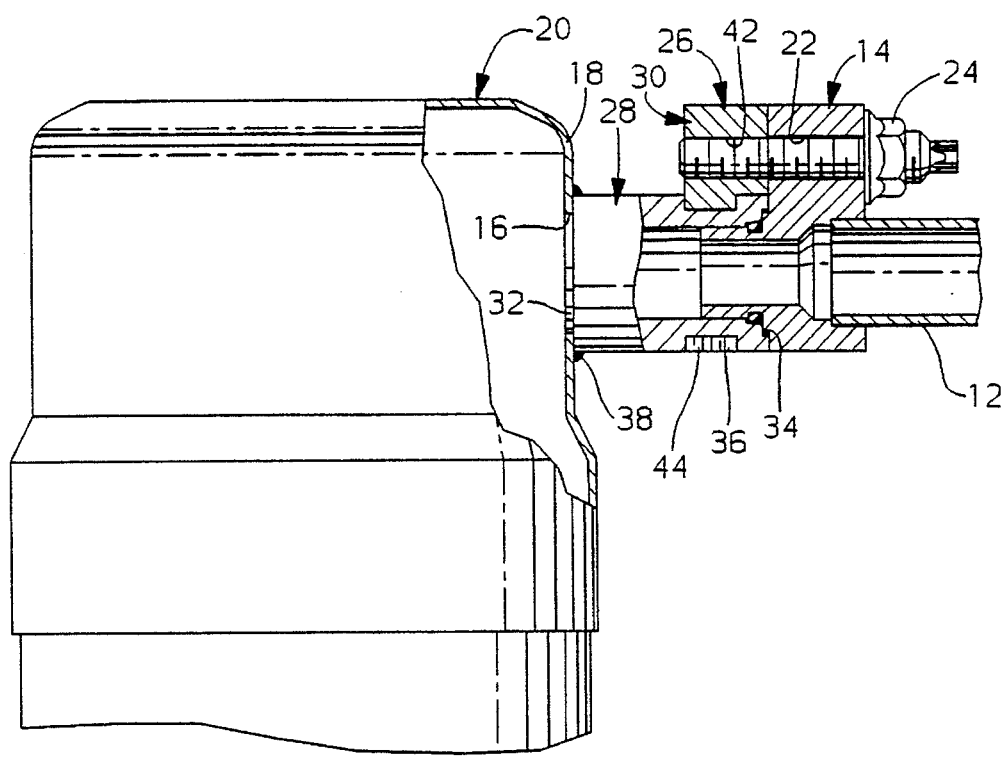
FIG. 1 is a side view of an A/D canister incorporating a preferred embodiment of the invention, with the canister and the two connector blocks partially sectioned.
Figure 6:
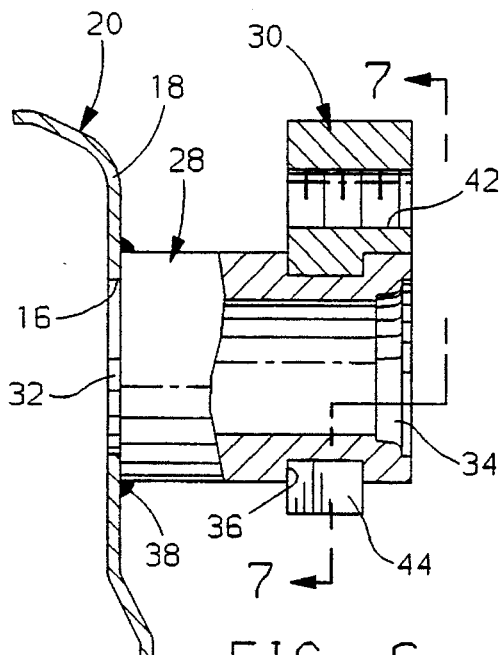
FIG. 6 is a view like FIG. 4, but after the side lobe has been inserted, and before it has been crimped in place.
Figure 7:
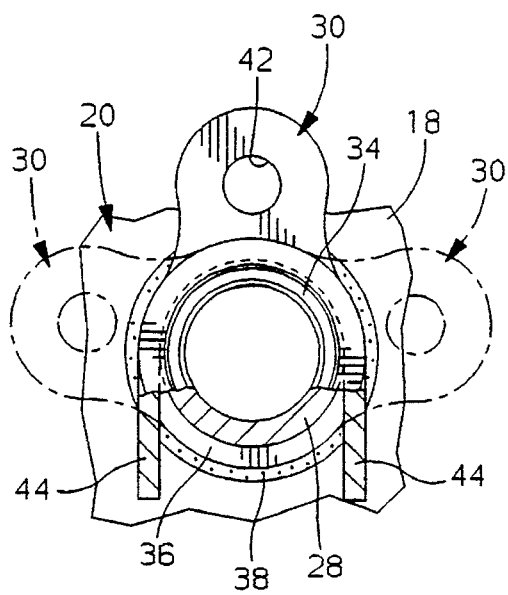
FIG. 7 is a view taken along the stepped line 7—7 of FIG. 6, showing various possible angular positions of the side lobe relative to the base in dotted line.
Figure 8:
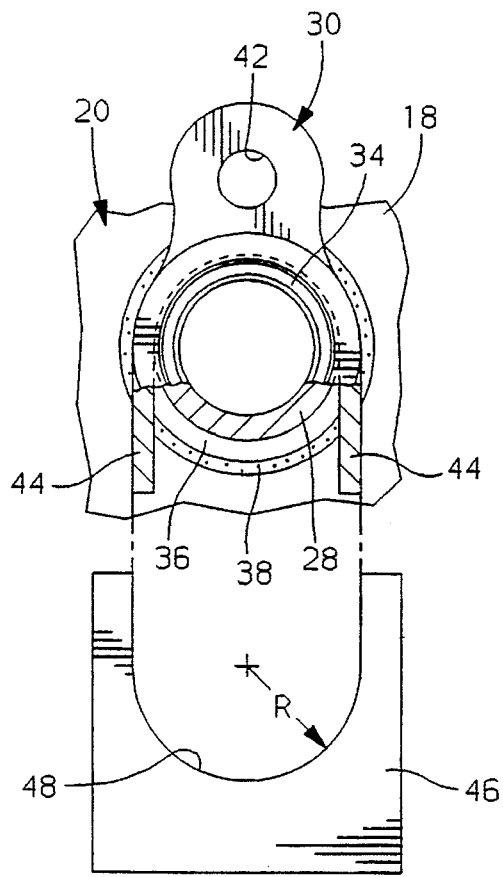
FIG. 8 is a view like FIG. 7, showing the tool that crimps the side lobe in place.
Figure 9:
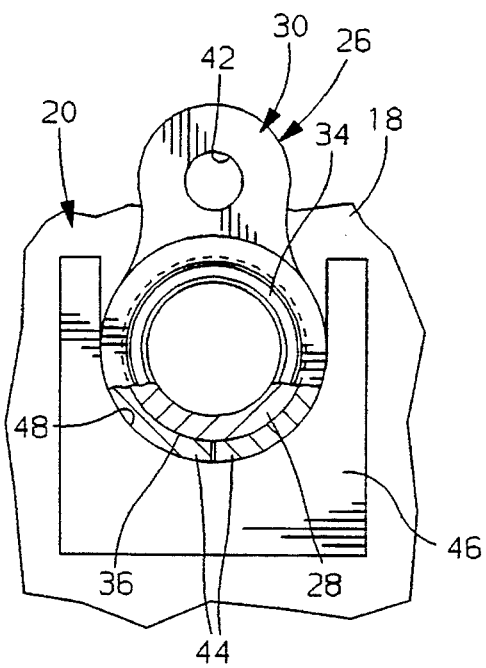
FIG. 9 is a view like FIG. 8 showing the crimping tool in operation.

Referring next to FIGS. 6 through 10, and to FIG. 1, once base 28 has been welded in place, the side lobe 30 and legs 44 are inserted over base 28 and into groove 36 until fully seated, as shown in FIG. 6. Since S is slightly less than D, a snap fit can be achieved that retains side lobe 30 temporarily to base 28, securely enough to not fall out of groove 36. Then, as shown in FIG. 7, side lobe 30 is turned to the proper orientation to align and match its bolt hole 42 to the installed position of the primary block's bolt hole 22, assuming that final position is known with some certainty. If it is not, an alternative series of steps is described below. Side lobe 30 is permanently secured in position by a crimping tool, indicated generally at 46. Crimping tool 46 is also fork shaped, with a U-shaped interior surface 48 that has a radius R substantially equal to the radius of base 28. The top of side lobe 30 is grounded in a suitable fixture that temporarily holds it and the desired angular position and crimping tool 46 is pushed over the legs 44, bending them fully around and down into the base groove 36. When completed, the outer surface of the crimped legs 44 matches and blends into the outer surface of base 28, filling groove 36 all the way around, but for a few degrees where the ends of the legs 44 do not touch. The outer face of side lobe 30 is substantially flush to the face of the base outer end 34, but inset therefrom to a very slight degree. While there is some inevitable spring back whenever a metal with any resilience is bent, so much of the circumference of base groove 36 is gripped by the legs 44 that side lobe 30 is very securely retained. Furthermore, W2 is sufficiently close to W1 that the crimped legs 44 cannot be easily twisted within groove 36. Consequently, whatever angular position is set before deformation will be held. Therefore, the bolt holes 22 and 42 will be aligned during installation, as shown in FIG. 10, and bolt 24 can be threaded through both to tightly draw the mating faces of the two blocks 14 and 26 into abutment, securely sealing refrigerant line 12 into port 16, as shown in FIG. 1.

Figure 11:
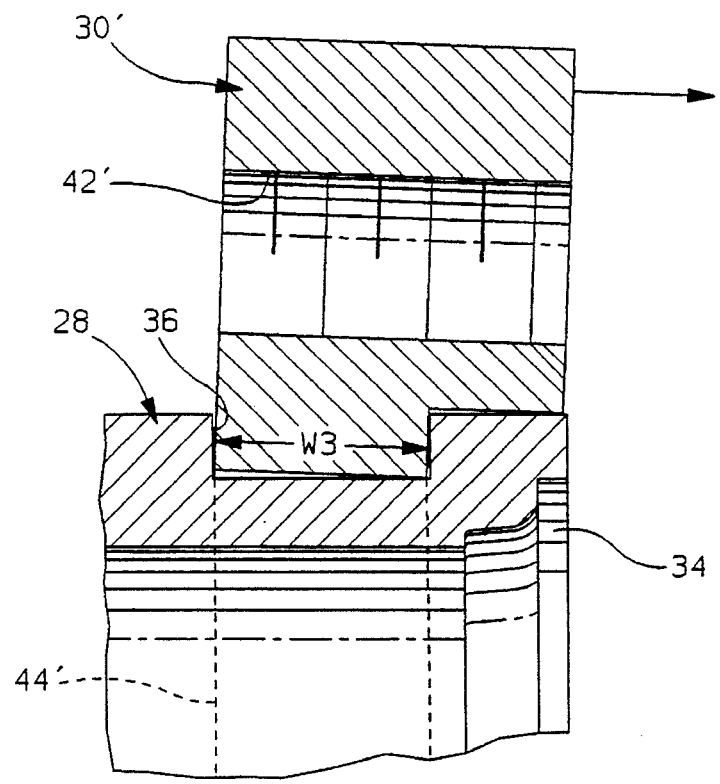
FIG. 11 is an enlargement of an alternative construction of the side lobe showing how the bolt tightening force can lock the side lobe in place in the base groove.

Referring next to FIG. 11, an alternative embodiment is disclosed. All components would be the same as described above, except for the side lobe 30, which is still very similar, and is indicated at 30'. Its only distinction, from side lobe 30, which would be visually imperceptible, is that its legs 44' have a width W3 which is slightly less than W2. Consequently, once the legs 44' have been deformed into the base groove 36, there is some axial clearance. The legs 44' still wrap around base groove 36 to the same degree, so that side lobe 30' would still be securely retained to base 28. However, the extra axial clearance within groove 36 would make it possible to slightly rattle the side lobe 30' back and forth within the groove 36, as well as to manually twist it around the axis of base 28 to any desired angular position. When the ultimate, installed position of the primary connector block bolt hole 22 is not known with certainty, it is therefore possible to manually twist side lobe 30' around until the two bolt holes 22 and 42' do align. Then, bolt 24 would be tightened, as before. Because of the extra clearance, the side lobe 30' cocks or tilts to a small degree to the right on the base 28, pulled toward the primary block 14 by the bolt 24. While the degree of cocking is visually exaggerated in FIG. 11, it is sufficient to wedge the sharp edges of the slightly narrower legs 44' within the base groove 36, thereby locking side lobe 30' tightly to base 28 at the proper angular orientation.

Variations of the disclosed embodiment could be made. The primary impetus behind making the secondary connector block 26 in two pieces, rather than one, is to allow unencumbered access to the welding tool 40. Since the primary connector block 14 is simply brazed onto the free end of refrigerant line 12, there is no similar motivation to make primary connector block multi-piece. Nonetheless, the general preference for one piece parts over multi-piece parts under standard design-for-manufacture practice is not a hard and fast rule. Overall ease of manufacture is the primary goal, coupled with ease of assembly later. Since the completely cylindrical base 28 can be so easily produced on a lathe, and since the side lobe 30 is not a great deal more difficult to make, the multi-piece design could well compete with the single piece design of primary connector block 14. Making both the primary and secondary connector blocks 14 and 26 to the same design would also provide the benefit of parts commonality. Furthermore, even when the wall through which the port 16 opens is thick enough to accept a threaded bolt directly, with no need for a secondary connector block to reinforce it, a two piece primary connector block at the end of the refrigerant line 12 could prove beneficial, especially the alternate design 26' shown in FIG. 11. The ability to twist the side lobe 30' around to align its bolt hole 42' to a mating bolt hole formed directly into the surface of another, larger component would give added flexibility during assembly. Therefore, it will be understood that it is not intended to limit the invention just to the embodiments disclosed.

The embodiments of the invention in which an exclusive property or privilege is claimed are defined as follows:

1. A method for fluidly connecting a line concentrically to a port through a thin wall by use of a primary connector block fixed to the end of said line that has a bolt hole located to the side of and parallel to a common axis of said line and port, comprising the steps of, providing a generally cylindrical base having a first end insertable into said port and a second end into which the end of said line is insertable, said base having a concentric groove with a width in its outer surface between said first and second ends, providing a fork shaped side lobe including a bolt hole to accommodate said bolt and a pair of bendable, parallel legs having a separation substantially equal to the diameter of said base groove, a width substantially equal to the width of said groove, and a total effective length greater than half, but less the entire, circumference of said groove, inserting said base first end into said port and securing it to said wall with a continuous bead of material at the interface between said base and wall while said interface is unobstructed by said side lobe, inserting said side lobe legs into said base groove and turning said side lobe about said common axis until said side lobe bolt hole is aligned with said primary connector block bolt hole, bending said legs around and into said groove to retain said side lobe permanently to said base, thereby forming a secondary connector block, and bolting said primary connector block to said secondary connector block.

2. A method for fluidly connecting a line concentrically to a port through a thin wall by use of a primary connector block fixed to the end of said line that has a bolt hole located to the side of and parallel to a common axis of said line and port, comprising the steps of, providing a generally cylindrical base having a first end insertable into said port and a second end into which the end of said line is insertable, said base having a concentric groove with a width in its outer surface between said first and second ends, providing a fork shaped side lobe including a bolt hole to accommodate said bolt and a pair of bendable, parallel legs having a separation substantially equal to the diameter of said base groove, an axial width slightly less than the width of said groove, and a total effective length greater than half, but less the entire, circumference of said groove, inserting said base first end into said port and securing it to said wall with a continuous bead of material at the interface between said base and wall while said interface is unobstructed by said side lobe, inserting said side lobe legs into said base groove and bending said legs around and into said groove to retain said side lobe to said base with a slight degree of axial clearance between said legs and groove, twisting said side lobe about said common axis until said side lobe bolt hole is aligned with the location of said primary connector block bolt hole, and bolting said primary connector block to said side lobe, thereby cocking said side lobe slightly relative to said base and wedging said legs within said base groove to lock said side lobe to said base.

* * * * *